(12) United States Patent
Welsch et al.

(10) Patent No.: US 6,226,173 B1
(45) Date of Patent: May 1, 2001

(54) DIRECTIONALLY-GROWN CAPACITOR ANODES

(75) Inventors: Gerhard Welsch; Donald McGervey, both of Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 09/238,082

(22) Filed: Jan. 26, 1999

(51) Int. Cl.[7] .................................................. H01G 9/02
(52) U.S. Cl. ............................................ 361/508; 361/528
(58) Field of Search .................................... 361/508, 509, 361/510, 516, 528–532

(56) References Cited

U.S. PATENT DOCUMENTS

| | | | |
|---|---|---|---|
| 3,410,766 | 11/1968 | Schmidt | 205/234 |
| 4,041,359 | 8/1977 | Mizushima et al. | 361/529 |
| 4,488,941 | * 12/1984 | Love | 204/15 |
| 5,185,075 | 2/1993 | Rosenberg et al. | 205/234 |

FOREIGN PATENT DOCUMENTS 2168383A   6/1986  (GB) .

* cited by examiner

Primary Examiner—Anthony Dinkins
(74) Attorney, Agent, or Firm—Fay, Sharpe, Fagan, Minnich & McKee, LLP

(57) ABSTRACT

A dendritic sponge which is directionally-grown on a substrate material has a high surface to volume ratio and is suitable for forming anodes for highly efficient capacitors. A dielectric film is formed on the sponge surface by oxidizing the surface. In a preferred embodiment, the dielectric is grown on titanium sponge and is doped with oxides of Ca, Mg, Sr, Be, or Ba to improve the film's dielectric constant or with higher valent cations, such as $Cr^{6+}$, $V^{5+}$, $Ta^{5+}$, $Mo^{6+}$, $Nb^{5+}$, $W^{6+}$, and $P^{5+}$, to reduce the oxygen vacancy concentration and leakage current of the dielectric film. A capacitor formed from the sponge includes a cathode electrolyte which serves as an electrical conductor and to repair the dielectric film by re-oxidizing the anode surface at areas of local breakdown. Sponges of titanium, tantalum, and aluminum form efficient dielectric films. In another embodiment, sponges of elements which do not form efficient dielectric films are coated with a dielectric material. Capacitors formed with titanium sponges have energy densities of $10^{-2}$ to 50 Watt hours and power densities of 100,000 to 10,000,000 Watts per kilogram of titanium.

41 Claims, 8 Drawing Sheets

DIRECTIONALLY-GROWN CAPACITOR ANODES

BACKGROUND OF THE INVENTION

The present invention relates to the capacitor arts. It finds particular application in conjunction with titanium, aluminum, tantalum and other metal sponges for capacitor anodes grown in the form of dendrites on metallic substrates, and will be described with particular reference thereto. It should be appreciated, however, that the invention is also applicable to the growth of sponges for a variety of applications in which a high accessible surface area to volume ratio is desired.

Electrical devices, such as power supplies, switching regulators, motor control-regulators, computer electronics, audio amplifiers, surge protectors, and resistance spot welders often require substantial bursts of energy in their operation. Capacitors are energy storage devices that are commonly used to supply these energy bursts by storing energy in a circuit and delivering the energy upon timed demand. Typically, capacitors consist of two electrically conducting plates, referred to as the anode and the cathode, which are separated by a dielectric film. In order to obtain a high capacitance, a large dielectric surface area is used, across which the electrical charge is stored. The capacitance, C of a capacitor is determined by the formula:

$$C[\text{Farads}] = \frac{Q[\text{coulombs}]}{V[\text{volts}]} \qquad (1)$$

where Q is the electrical charge and V is the voltage between the plates. Capacitance is proportional to the charge-carrying area of the facing plates, A, and is inversely proportional to the gap width, X, so that $$C[\text{Farads}] = (\varepsilon \cdot \varepsilon_0 [F/m]) \frac{A[m^2]}{X[m]} \qquad (2)$$

where ($\in \cdot \in_0$) is a proportionality constant, $\in_0$ is the permittivity of vacuum (value=8.85 ×10$^{12}$ Farad/m), and $\in$ is the relative permittivity or dielectric constant for a dielectric substance. High capacitance capacitors should have a large area, A, and a thin dielectric film with a high dielectric constant.

Commercial capacitors attain large surface areas by one of two methods. The first method uses a large area of thin foil as the anode and cathode. See, e.g., U.S. Pat. No. 3,410,766. The foil is either rolled or stacked in layers. In the second method, a fine powder is sintered to form a single slug with many open pores, giving the structure a large surface area. See, e.g., U.S. Pat. No. 4,041,359. Both these methods require considerable processing to obtain the desired large surface area. In addition, the sintering method results in many of the pores being fully enclosed and thus inaccessible to the dielectric.

Metallic sponges provide an opportunity for increasing the surface area over conventional capacitor materials. Metallic sponges of titanium, such as those produced by the Hunter and Kroll processes, have relatively large surface areas. However, due to the random growth patterns, surface areas are not maximized and a considerable portion of the surface is inaccessible, being fully enclosed by the sponge. Additionally, chemical residues from the process generally remain on the sponge, and may be trapped within the enclosed pores or within remotely accessible pores.

To be effective as an energy storage device, a capacitor should have a high energy density (Watt-hours per mass) or high power density (Watts per mass). Conventional energy storage devices tend to have one, but not both, of these properties. For example, lithium ion batteries have energy densities as high as 100 Wh/kg, but relatively low power densities (1–100 W/kg). Examples of energy storage devices with high power density are RF ceramic capacitors. Their power densities are high, but energy densities are less than 0.001 Wh/kg. The highest energy capacitors available commercially are the electrochemical supercapacitors. Their energy and power densities are as high as 1 Wh/kg and 1,000 W/kg, respectively.

The dielectric film within the capacitor serves as the energy storage medium. Energy density is the amount of stored energy per unit volume of dielectric. To maximize the energy density of a capacitor, it is desirable to have a dielectric with a large surface per volume, a high dielectric constant, and a high dielectric strength. The energy density is a function of the dielectric constant and the dielectric strength, as follows:

$$\text{Energy density} = \text{dielectric constant} \times (\text{dielectric strength})^2 \qquad (3)$$

A good capacitor geometry is one in which the dielectric is readily accessed electrically, that is, it has a low equivalent series resistance that allows rapid charging and discharging. High electrical resistance of the dielectric prevents leakage current. A good dielectric, therefore, has a high electrical resistance which is uniform at all locations. Additionally, a long-term stability (many charging-discharging cycles) is desired. Conventionally, dielectrics tend to become damaged during use.

The present invention provides a new and improved capacitor having an anode formed from a directionally-grown metallic sponge which provides high surface area and much improved energy storage capacity over conventionally known capacitors and a dielectric film with good electrical properties which has the ability of self repair in the event of a breakdown in the dielectric film.

SUMMERY OF THE INVENTION

In accordance with one aspect of the present invention, a capacitor is provided. The capacitor includes an anode formed from a directionally grown sponge having a high surface area. A dielectric film is formed on the surface of the sponge. A cathode includes an electrolyte in contact with the dielectric film.

In accordance with another aspect of the present invention, a directionally grown sponge suitable for forming capacitor anodes is provided. The sponge is formed by a method which includes growing dendrites on a substrate. The dendrites include an element selected from the group consisting of aluminum, antimony, arsenic, bismuth, cadmium, chromium, cobalt, copper, gallium, germanium, hafnium, iron, lead, magnesium, manganese, nickel, niobium, selenium, silicon, silver, tantalum, tellurium, thallium, tin, titanium, vanadium, zinc, zirconium, and alloys thereof.

In accordance with another aspect of the present invention, a method of forming a directionally grown sponge suitable for use as a capacitor anode is provided. The method includes directionally growing an electrically conductive sponge material on a substrate, such that the sponge material has a high surface area with few enclosed pores.

In accordance with another aspect of the present invention, a method of forming a capacitor is provided. The method includes forming an anode from an electrically conductive sponge material which has been directionally grown on a substrate and forming a dielectric film on a surface of the sponge.

One advantage of the present invention is that anodes with large surface areas per unit mass are formed, thereby enabling the size of the capacitor to be reduced.

Another advantage of the present invention is that it enables capacitors with energy densities of $10^{-2}$ to 50 Wh/kg hours and power densities of 100,000 to 10,000,000 W/kg to be produced. For capacitors with liquid metal electrolytes, even higher power densities are possible.

Another advantage of the present invention is that titanium capacitors produced from directionally-grown anodes are suited to use in applications operating at frequencies between 20 Hz and 20,000 Hz.

Another advantage of the present invention arises from the ability to grow an efficient dielectric film on the anode surface, which is able to self-repair when damaged.

BRIEF DESCRIPTION OF THE DRAWINGS

The invention may take form in various components and arrangements of components and in various steps and arrangements of steps. The drawings are only for purposes of illustrating a preferred embodiment, and are not to be construed as limiting the invention.

DETAILED DESCRIPTION OF THE PREFERRED EMBODIMENTS

Capacitor anodes with a large internal surface area are produced by directional growth of a dendritic sponge on a suitable substrate. An effective dielectric is readily formed on the surface of the sponge by oxidation of the surface or coating the surface with a suitable dielectric material.

Figure 1:
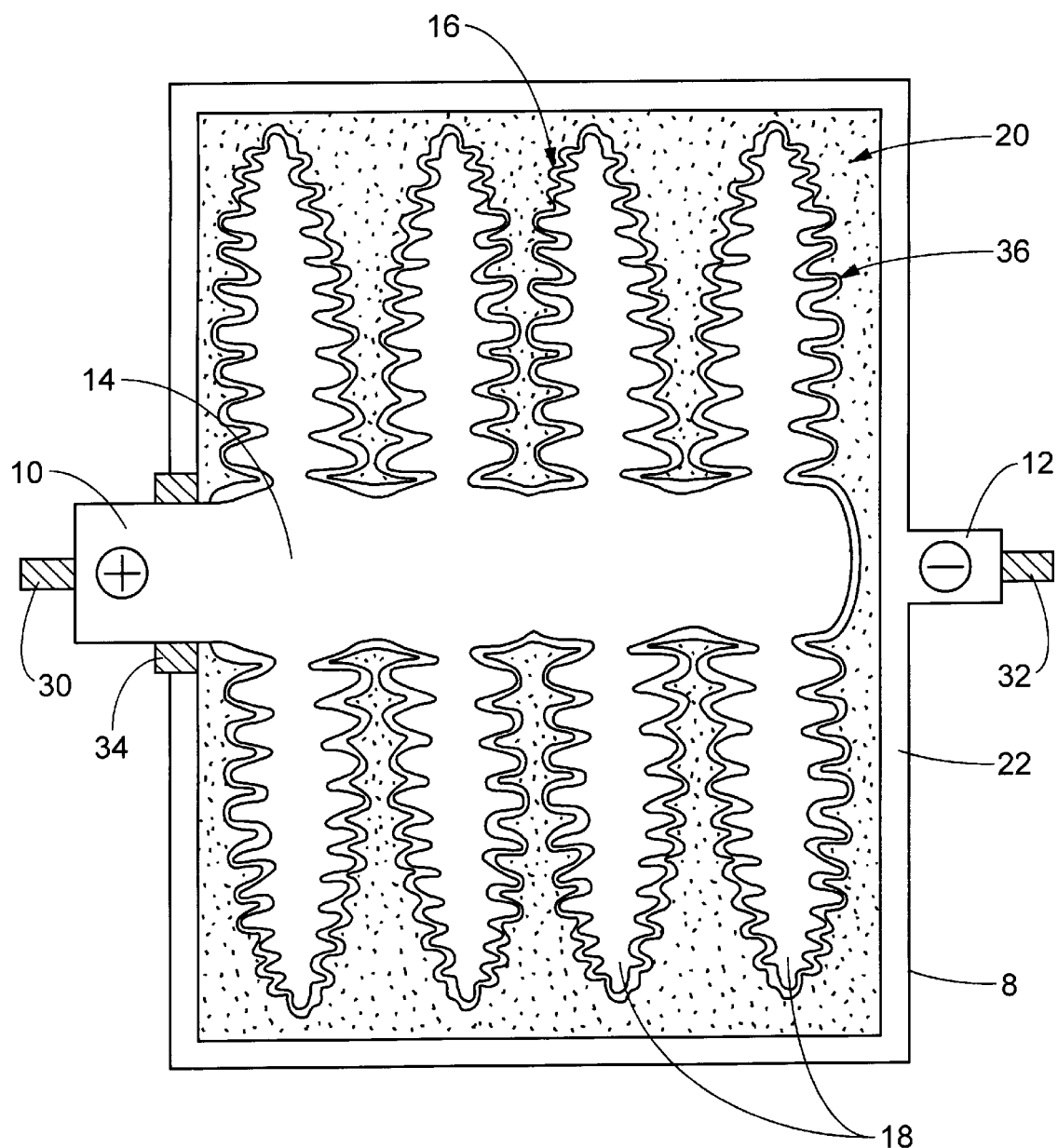
FIG. 1 is a side elevational view of a capacitor according to the present invention.

With reference to FIG. 1, a portion of a capacitor incorporating the sponge is shown. The capacitor 8 includes an anode 10 and a cathode 12. The anode includes a skeleton or substrate 14 and a dendritic sponge material 16. The sponge material includes numerous dendrites 18 which extend from the substrate surface. The cathode includes an electrolyte 20 which surrounds the anode and a casing 22 which provides an outer cover for the capacitor. The casing may be formed from any suitable rigid conducting material, such as aluminum, brass or copper. Preferably, the cathode casing is of the same material as the anode to avoid galvanic effects.

Conductor leads 30 and 32 connect the anode and the cathode, respectively with an electrical circuit (not shown) in which the capacitor is used. An annular insulating seal 34, formed from a glass bead or other suitable material, insulates the anode lead from the casing 22. A dielectric material 36, in the form of a continuous film on the dendrites 18, is interposed between the dendrites and the electrolyte 20.

Suitable materials for the dendrite sponge are those which form an oxide which is a good dielectric. Examples include titanium, aluminum, tantalum, niobium, zirconium, vanadium, chromium, silicon, germanium, or alloys of these metals. Titanium is a particular good material for the sponge. It is lighter and cheaper than tantalum. Additionally, titanium oxide has an energy density approximately 100 times that of aluminum or tantalum oxide. Other conductive materials which do not form good dielectrics, such as copper may also be used, and coated with a suitable dielectric.

The substrate may be in the form of a ribbon, wire, cast structure or sheet. The substrate provides the sponge with structural stability and electrical conduction. For higher powered capacitors, a thicker cross-section and shorter conduction length is preferred. The substrate may be formed from the same material as the sponge, or a different material. Substrates of silver, copper or aluminum are particularly preferred because their high electrical conductivity provides the capacitor with rapid capacitor discharge at very high power without overheating of the conductor leads.

It should be appreciated that FIG. 1 is not shown to scale, since the dendrites are, in reality, microscopic in size. To provide a large surface area, the sponge comprises fine dendrites which preferably have a width of about 30 micrometers or less, and more preferably of 1 micrometer or less. The interdendritic spaces or pores preferably have a pore size of 30 micrometers or less, more preferably of 300 nm or less.

Figure 2:
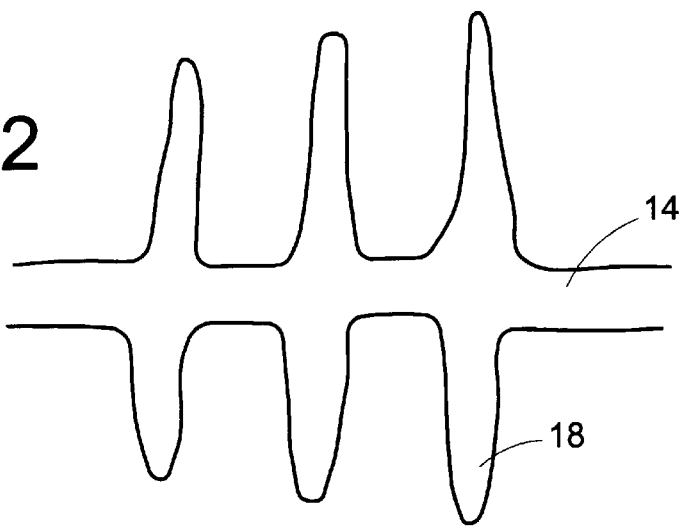
FIG. 2 is a schematic view of the substrate and dendrites of FIG. 1.
Figure 3:
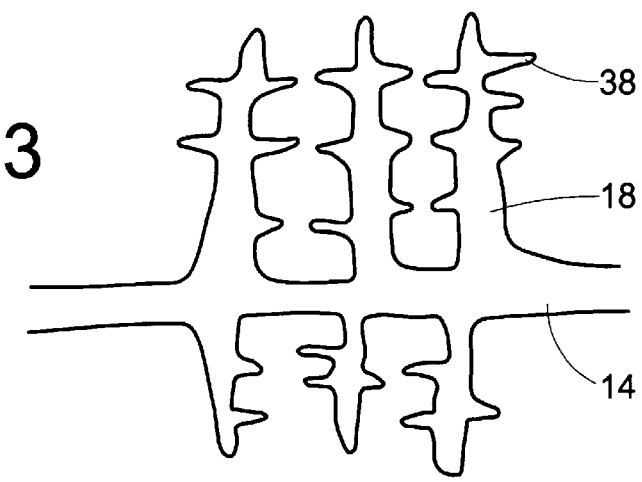
FIG. 3 is a schematic view of an alternative embodiment of the substrate and dendrites of FIG. 1.
Figure 4:
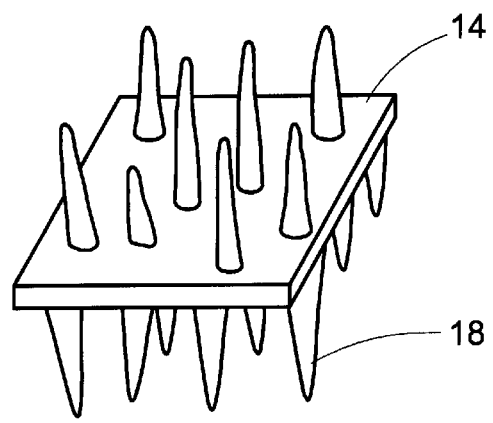
FIG. 4 is a perspective view of the substrate and dendrites of FIG. 1.

FIGS. 2, 3, and 4 show various structures of the dendrites 18. The dendrites are preferably perpendicular or near perpendicular to the substrate 14 to minimize electrical resistance. The dendrites may in turn have smaller, or secondary dendrites 38 growing from the surfaces to increase further the surface area per unit substrate area, as shown in FIG. 3. The directionally grown dendrites have a high length to width ratio and are closely and relatively evenly spaced for maximizing the surface area.

Where the dielectric film is formed by oxidizing the surface of the dendrites, the width of the dendrites is preferably large enough that the dendrites are not consumed or unduly weakened during growth of the dielectric film. For example, if a 100 nm oxide film is to be grown, and the ratio of volume of oxide/volume of metal consumed (P.B. ratio) is 1, the width of the dendrites should be about 200 nm or greater. For higher P.B. ratios, the width of the dendrites may be proportionately smaller. For a titanium oxide dielectric grown on titanium, the P.B. ratio is approximately 1.7, for tantalum oxide grown on tantalum the P.B. ratio is approximately 2.5, and for aluminum oxide on aluminum the ratio is approximately 1.3 (See, P. Kofstad, High Temperature Corrosion, Elsevier, 1988).

Packing efficiency, defined as the volumetric energy density of a capacitor relative to the energy density of the dielectric, is improved relative to a conventional foil capacitor. The maximum packing efficiency for the sponge dendrite structure is $\pi\sqrt{3}/6e$, (where e is approximately 2.72) for cylindrical dendrites arranged in hexagonal arrays. Although in practice such tight packing is not achieved, the packing efficiency is nevertheless substantially higher than for conventional metal foil capacitors, where there is a processing limit on the minimum thickness of the foil.

The directionally-grown dendrites provide a high surface to volume ratio and good surface accessibility. The accessibility is important for electrical properties in that the conduction paths created are relatively short and tend to be in parallel. This provides a low internal resistance or low series resistance during operation of capacitors formed from the sponge. The power densities which may be achieved are high and power dissipation factors low during capacitor operation. The accessibility also improves purification of the sponge, in that unwanted reactants are readily removed from the interdendritic spaces, and aids in formation of the dielectric by providing surface access to an oxidizing agent. Further, the accessibility allows the electrolyte to infiltrate the sponge for complete filling of the sponge.

Figure 5:
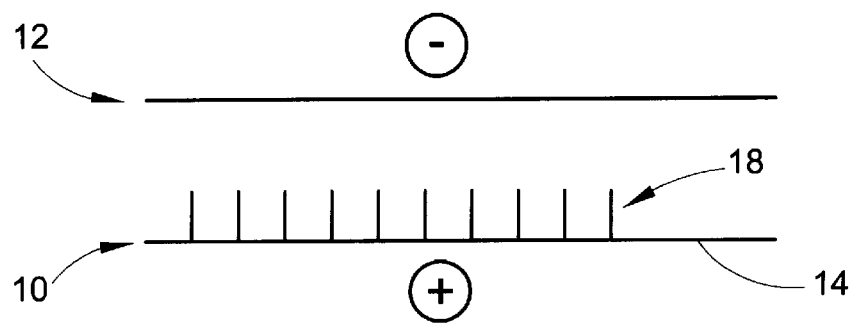
FIG. 5 is a schematic view of an anode and cathode configuration in which dendrites are grown on one surface of the substrate, according to one embodiment of the present invention.
Figure 6:
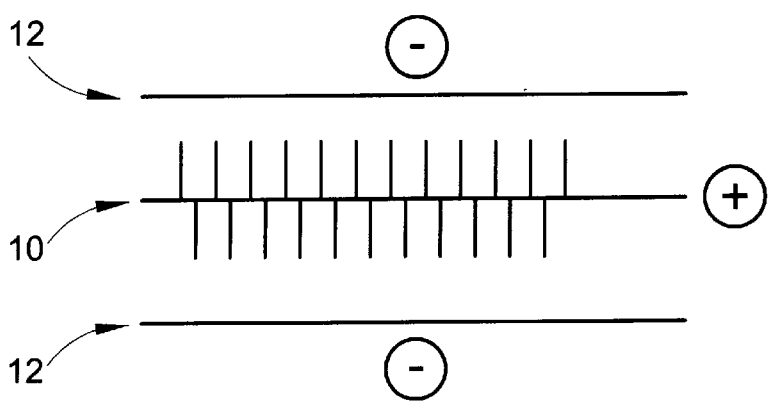
FIG. 6 is a schematic view of an alternative anode and cathode configuration in which dendrites are grown on upper and lower surfaces of the substrate according to another embodiment of the present invention.
Figure 7:
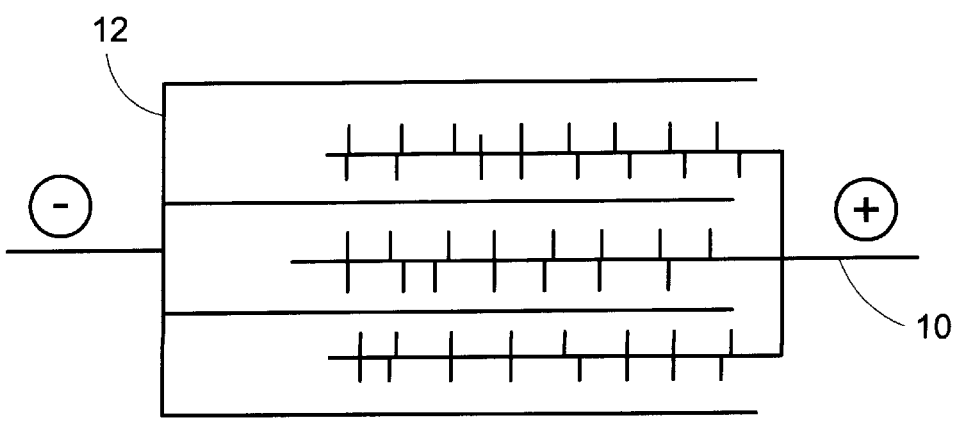
FIG. 7 is a schematic view of another alternative anode and cathode configuration in which cathode and anode portions are interdigitated according to another embodiment of the present invention.
Figure 8:
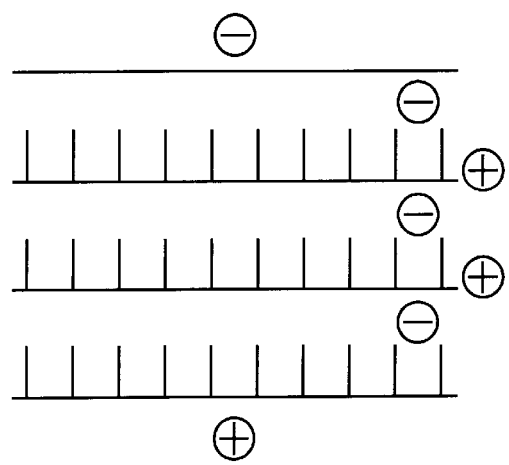
FIG. 8 is a schematic view of an alternative anode and cathode configuration in which anode layers are stacked according to another embodiment of the present invention.
Figure 9:
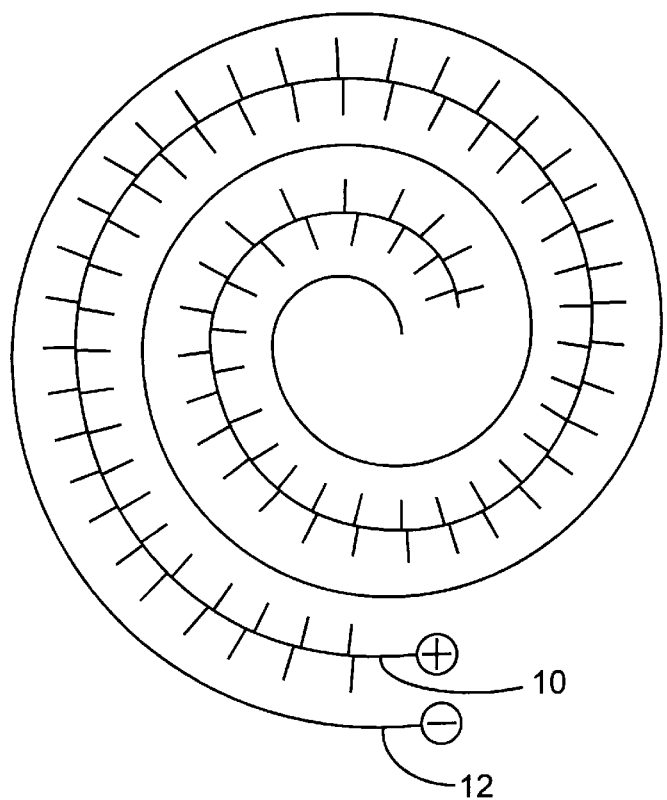
FIG. 9 is a schematic view of an alternative anode and cathode configuration in which the anode and cathode are coiled according to another embodiment of the present invention.

FIGS. 5–9 show various configurations of the anode 10 and cathode 12 within a capacitor. The anode may be in the form of a single layer of dendrites 18 on one surface of the substrate 14, with the cathode as a plain foil facing the dendrites, as shown in FIG. 5. Or a double layer of dendrites may be surrounded by the cathode, as shown in FIG. 6. To maximize the anode surface area, the anode and cathode portions may be inter-leaved, as shown in FIG. 7. FIG. 8 shows many layers stacked in series to yield a high voltage capacitor. FIG. 9 shows yet another embodiment in which the anode and cathode are wrapped in a spiral configuration. Other configurations are also contemplated.

Sponge Formation

To form the sponge, the dendrites are directionally-grown on the substrate material. Several methods are available for forming the dendritic sponge. Three processes have been found to produce particularly uniform dendrites of large surface area. In the first process, a chemical method, a metal halide, in vapor form, is reduced by a reducing agent, preferably an alkali or earth alkali metal, such that the dendrites of the reduced metal are deposited onto a substrate material.

The metal halide is one which is gaseous at the reaction temperature. Several metal halides have been found to be suitable. These include chlorides, fluorides, and iodides of titanium, aluminum, tantalum, niobium, zirconium, vanadium, chromium, silicon, germanium, or mixtures thereof. For example, in the case where a titanium sponge is formed by the reduction of titanium chloride with magnesium, the deposition process can be described by the following equation:

$$TiCl_4(g) + 2\ Mg(\text{liquid or vapor}) \rightarrow Ti(s) + 2\ MgCl_2(\text{liquid or solid}) \quad (4)$$

The reaction products are solid titanium and magnesium chloride, which may be liquid or solid, depending on the temperature used.

Because of the coexistence of the two reaction products, in this case titanium and magnesium chloride, the sponge morphology is developed consisting of titanium dendrites with magnesium chloride residing in the interdendritic spaces. The magnesium chloride, or other alkali metal halide, is removed by draining and vacuum distillation. Vacuum distillation ensures that residual traces of magnesium chloride are removed so that they do not contaminate the sponge. Preferably, the distillation is carried out at between 800 and 1200° C. at a high vacuum to ensure complete removal of the alkali metal halide.

Magnesium and sodium are particularly preferred reducing agents, with sodium being the most preferred because of the easier removal of sodium chloride. Additionally, using sodium as the reducing agent allows selection of the level of coarseness or fineness of the sponge. Very fine sponge can be made at a relatively low temperature (600–700° C.).

Mixed sponges may also be formed by this process.

Figure 10:
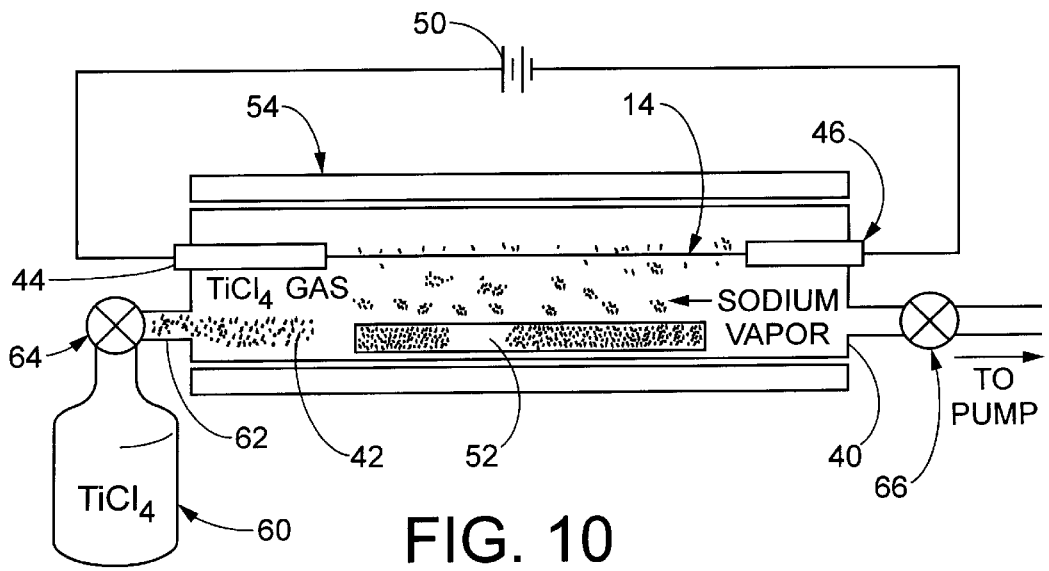
FIG. 10 is a schematic view of a system for chemically forming directionally grown sponges according to the present invention.
Figure 11:
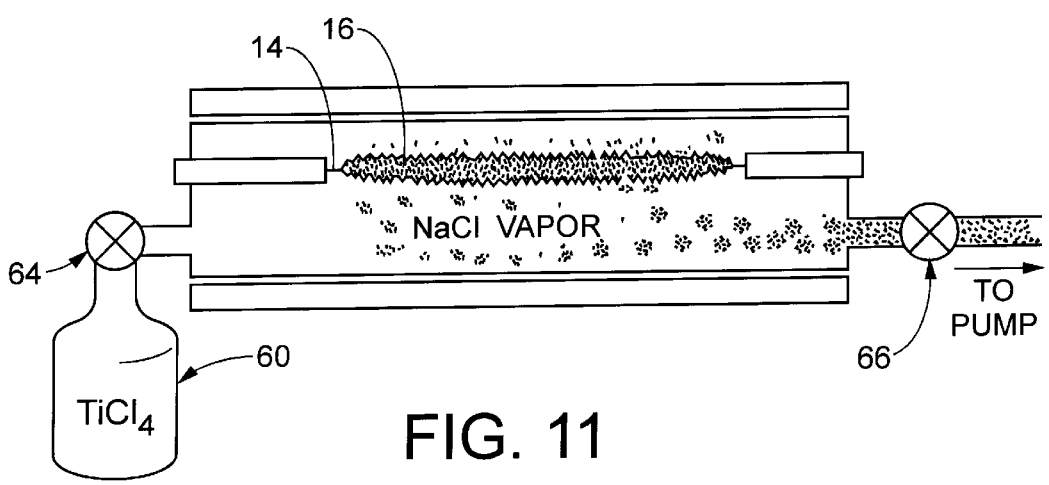
FIG. 11 is a schematic view of the system of FIG. 10 during the distillation phase.

For example, a Ti—Zr alloy sponge may be formed by the reduction of a mixture of $TiCl_4$ and $ZrCl_4$ with an alkali (A) or earth alkali (EA) element. The sponge synthesis process proceeds by the reaction:

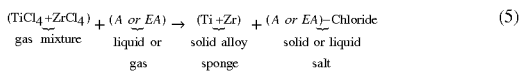
$$(TiCl_4 + ZrCl_4) + (A\ or\ EA) \rightarrow (Ti + Zr) + (A\ or\ EA)\text{-Chloride} \quad (5)$$
gas mixture · liquid or gas · solid alloy sponge · solid or liquid salt A specific example for forming a sponge of 50 atom % Ti and 50 atom % Zr alloy using potassium as the reducing element is:

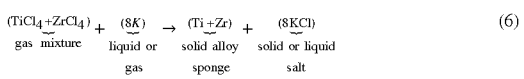
$$(TiCl_4 + ZrCl_4) + (8K) \rightarrow (Ti + Zr) + (8KCl) \quad (6)$$
gas mixture · liquid or gas · solid alloy sponge · solid or liquid salt FIGS. 10 and 11 illustrate the process of depositing the dendrites 18 onto the substrate 14. The process is described with particular reference to the formation of a titanium sponge by reduction of titanium chloride with sodium. It should be appreciated, however, that the process is also suited to the formation of other metal sponges with different reducing agents. The process conditions will vary, depending on the vapor pressure of the reducing metal, and other reaction variables.

A reaction vessel 40 for carrying out the sponge formation process defines a chamber 42. The substrate is supported within the chamber 40 by electrically conducting connectors 44 and 46. A power supply 50 is connected across the connectors for heating the substrate to a suitable reaction temperature.

A reservoir 52 within the chamber contains sodium, or other reducing metal, to provide a vapor pressure of the reducing agent within the chamber. The vapor pressure generated is dependent on the temperature of the chamber. For example, at 520° C., the vapor pressure of sodium is $10^{-2}$ atmospheres. A heating source 54 surrounds the chamber for heating the chamber to a suitable temperature for providing the vapor.

The heating source 54 is first energized and the chamber brought to the desired temperature for vaporizing the reducing agent. For a sodium reducing agent, a suitable chamber temperature is 705° C., although other temperatures can also be used. The power supply 50 is then energized to resistance heat the substrate 14 to a selected deposition temperature. Typically, the deposition temperature is higher than the temperature of the chamber, such that the deposition of titanium takes place primarily on the substrate. The heated substrate provides a limited number of nucleation sites for growth of dendrites.

The exact microstructure will depend on the number of the nucleation sites and on the processing parameters, namely the vapor pressure of sodium, $P_{Na}$, the vapor pressure of titanium chloride, $P_{TiCl4}$, and the reaction temperature.

Once the desired chamber and substrate temperatures have been achieved, a source of a halide of the sponge material 60, such as a source of titanium chloride, supplies titanium chloride to the chamber 42 through an inlet 62. An inlet valve 64 between the source 60 and the inlet 62 allows the rate of introduction of titanium chloride to be regulated. At the temperature and pressure of the chamber, the titanium chloride is in the form of a vapor which is reduced by the sodium at the surface of the heated substrate. A directionally outward-growing dendritic sponge of titanium dendrites with sodium chloride in the interdendritic spaces is formed.

Chamber temperatures of 100–1,000° C. are suitable for the formation of a titanium sponge in this manner. A particularly preferred temperature is below 800° C. The rate of growth and shape of the dendrites is dependent on the temperature. At lower temperatures, the dendrites are fine with large surface areas. However, the growth rate is relatively slow. At higher temperatures, the growth is much faster, but the dendrites are wider and thus have a smaller surface area to volume ratio. Thus the surface area of the sponge can be selected for the desired properties of the capacitor.

Once a suitable growth of sponge has been achieved, the unwanted reaction product, sodium chloride, is removed by vacuum distillation, as shown in FIG. 11. A vacuum pump valve or outlet valve 66 connects an outlet of the reaction vessel to a source of vacuum (not shown), such as a pump. The inlet valve 64 is closed to stop the supply of titanium chloride into the chamber 42 and the source of sodium 52 is preferably sealed or removed from the chamber to prevent unnecessary wastage of sodium. The vacuum pump valve 66 is opened and the temperature of the chamber adjusted to a suitable distillation temperature. The vacuum pump draws the sodium chloride from the interstices in the sponge and out of the chamber. Because of the regular orientation of the dendrites, removal of the sodium chloride is readily achieved from essentially all the surfaces of the sponge. No enclosed pores are created which would trap the sodium chloride.

The time needed for distillation depends on temperature and on the length and width of the gas diffusion paths from the interdendritic regions. The vapor pressure of sodium chloride in atmospheres is given by the following equation:

$$\log(P_{NaCl}) = -12{,}440\, T^{-1} - 0.90 \log T - 0.46 \times 10^{-3}\, T + 11.43 \quad (7)$$

where T is the temperature in degrees Kelvin. The vapor pressure of sodium chloride ranges from $4 \times 10^{-5}$ to $1.9 \times 10^{-2}$ atmospheres in the 800 to 1,000 degree temperature range. Complete removal of the sodium chloride by vacuum distillation is thus readily achieved.

A second process for forming the dendritic sponge is a solidification method. In this method, the sponge is deposited from a mixed liquid formed by heating the material for the sponge with an insoluble substance to a temperature at which both the sponge material and the insoluble substance are liquid. Upon solidification, a heterogeneous solid is obtained. The method is particularly suited to the formation of aluminum sponges. Table 1 lists combinations of materials for forming the sponge. The insoluble substance is one which is insoluble in the sponge material selected. It may be an element, or a salt.

The heated mixture of mutually insoluble materials is allowed to cool. It may be subjected to freezing temperatures to speed solidification. The mixture solidifies with a dendritic structure such that part of the solid consists of the sponge material and the interdendritic spaces consist of the insoluble material. The higher the cooling rate the finer will be the dendrite structure and the greater will be the sponge's surface area per unit substrate area. For example, a mixture of aluminum and potassium solidifies as an aluminum dendrite structure with the interdendritic spaces consisting of potassium. The potassium can be removed, for example, by vacuum distillation leaving an aluminum dendritic skeleton.

Figure 12A:
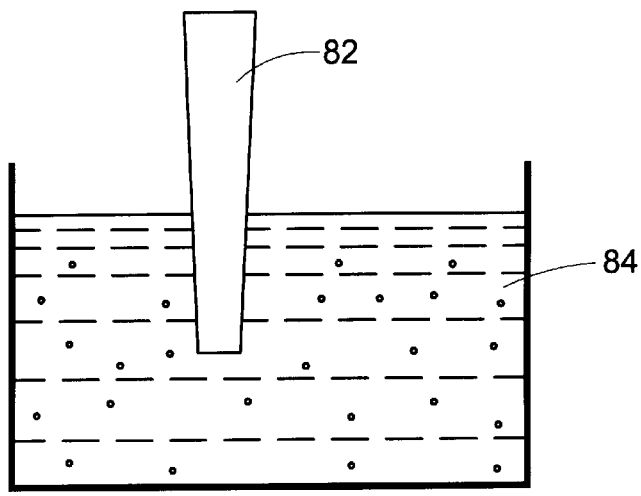
FIGS. 12A, 12B, and 12C are side schematic views to show the progressive growth of a directional sponge by a solidification method.
Figure 12B:
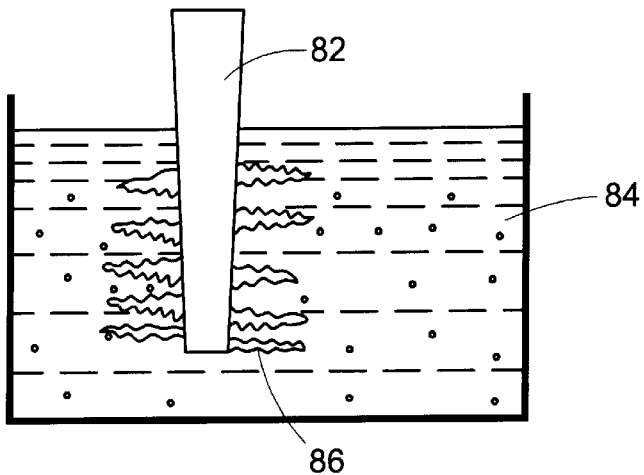
Figure 12C:
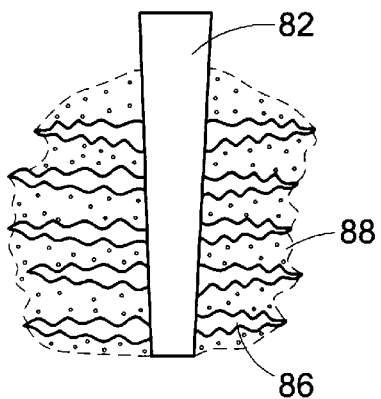

The sponge made by the solidification process may be grown as a random sponge where guidance is absent during the solidification process. Alternatively, it may be grown as directionally solidified dendrites on a provided substrate 80 as shown in FIGS. 12A, 12B, and 12C, or extruded as ribbon, as shown in FIGS. 13 and 14. The directionality of the solidification can be further enhanced by providing a temperature gradient, one in which the substrate is cooler than the growing dendrite. For capacitors, the directionally solidified sponge is preferred since the insoluble interdendritic material is readily removed, there are few inaccessible areas, infiltration of the electrolyte is easier, and the internal resistance is lowered.

In the embodiment of FIG. 12, a cold metal substrate 82 is dipped into well-mixed molten mixture 84 of a sponge material 86 and an insoluble material 88. As seen in FIG. 12C, dendrites of the sponge material grow on the substrate in a directional manner generally perpendicular to the substrate surface. The insoluble material is rejected into the interdendritic space.

Figure 13A:
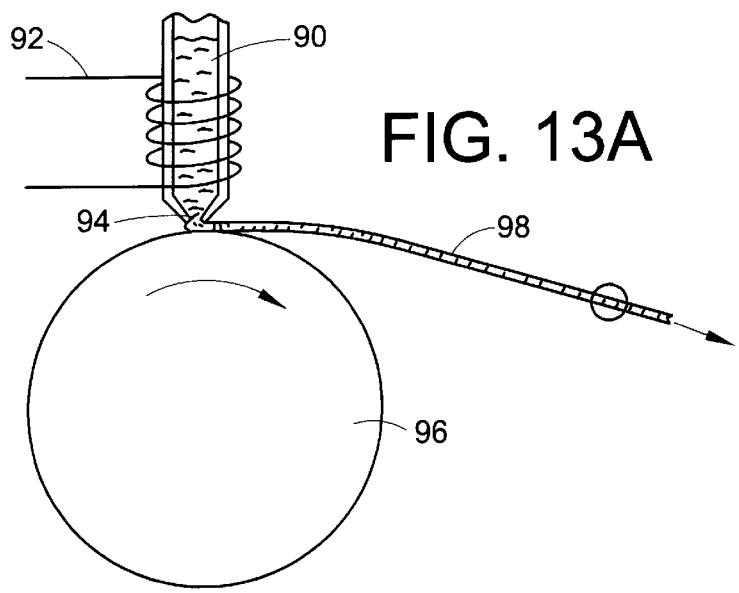
FIGS. 13A and 13B are schematic views of a ribbon extrusion system to show the growth of a dendritic sponge by the solidification process and the extrusion of a ribbon.
Figure 13B:
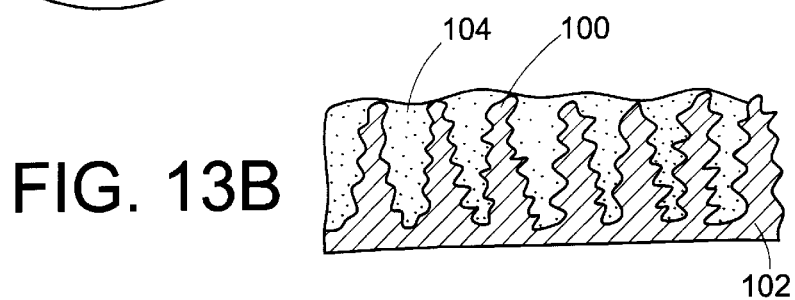
Figure 14:
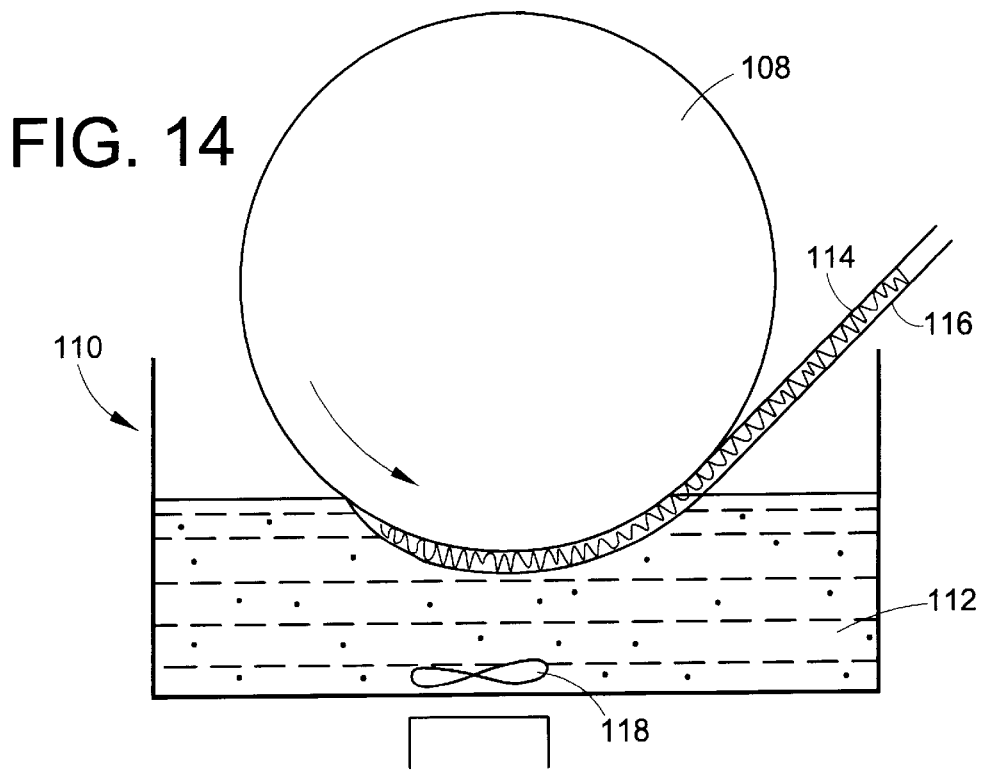
FIG. 14 is a side schematic view to show an alternative embodiment of a ribbon extrusion system; and, FIGS. 15A, 15B, 15C, and 15D are schematic views of a metal substrate A) prior to oxidation, B) after oxidation, C) after partial reduction, and D) after complete reduction of the oxide film.

In the embodiments of FIGS. 13A and B, and 14, the molten mixture of sponge material and insoluble material is brought into contact with a rotating heat sink. As shown in FIG. 13, the mixture 90, heated by a heating coil 92, is allowed to flow through a narrow aperture 94 onto a rotating cylindrical heat sink 96, such as a chilled roller, positioned below the mixture. As the heat sink rotates, a ribbon 98 of solidified sponge material forms. As shown in the enlarged section of FIG. 13B, the dendrites 100 in the ribbon grow away from the side closest to the heat sink, with a continuous layer 102 of the sponge material closest to the heat sink. As before, the insoluble material 104 is removed from the interdendritic spaces by vacuum distillation.

In the embodiment of FIG. 14, a rotating cylindrical heat sink 108 contacts a bath 110 of the mixture 112 of sponge material 114 and insoluble material 116. Optionally, a stirrer 118 in the bath keeps the sponge material and insoluble material well mixed. As the heat sink rotates, a layer of the mixture adjacent the sink cools and a ribbon 120 forms. As with the embodiment of FIG. 13, the dendrites of the sponge material 114 grow away from the surface of the heat sink and the insoluble material concentrates in the interdendritic spaces.

For the solidification process, the material for the sponge preferably has a melting point which is below about 1,700°

C., and more preferably below 1200° C., for ease of processing. Preferably the material used for the sponge also has a stable oxide which is a good dielectric material, as will be discussed later. Optionally, the sponge material may be an alloy of one or more of the following elements, such as Mg, Al, Si, Zn, Ga, Ge, As, Se, Cd, In, Sn, Sb, Te, Tl, Pb, Bi, and rare earth elements, so long as the alloys form stable oxides that are suitable for dielectric films.

TABLE 1

Materials from which Fine Solidification Structures may be made for Capacitors

| Sponge Material | Insoluble Substance Removed From Solidified Structure | Dielectric |
|---|---|---|
| Al, Mg, Sn, Pb, Zn, Cu, Ag, Si, Ge, Sb, Te, Tl, Bi, and rare earth elements with melting points below about 1200° C. | Na, K, Rb, or Cs | $Al_2O_3$, MgO, etc. |
| Alloys of Mg, Al, Si, Zn, Ga, Ge, As, Se, Cd, In, Sn, Sb, Te, Tl, Pb, Bi, provided the alloy forms a stable oxide | Na, K, Rb, Cs | Mixed oxides |
| Ti<br>Ti—Be alloy | Ca, Sr, Ba | $TiO_2$ or $TiO_2.BeO$, $TiO_2.CaO$, $TiO_2.SrO$, $TiO_2.BaO$, respectively, |
| Zr, Hf, V, Nb, Ta, Cr, Mn, Fe, Co, Ni | Ca, Sr, Ba | Forming own oxide or coated with another dielectric |
| Ti and Zr, Hf, V, Nb, Ta, Cr, Mn, Fe, Co, Ni, Be | alkali or earth alkali halides | Forming their own oxide or coated with another dielectric |

A third process for forming the dendritic sponge is an oxidation/reduction method. In a first step an oxide scale is grown on a suitable substrate. With reference to FIGS. 15A, 15B, 15C, and 15D, the substrate 120 may be in the form of a sheet, strip, wire, mesh, or fabricated skeleton of a metal, such as Ti, Ta, or alloys of Ti—Ta, Ti—Zr, or Ti—Be. The thickness of the scale 122 is preferably between 0.5 micrometers and 10 millimeters. The metal is one which has an oxide of the type having a Pilling-Bedworth ratio of greater than 1. When this is the case, the molecular volume of oxide scale 122 produced is greater than the volume of the metal 124 consumed (compare FIGS. 15B and 15A). For tantalum, for example, which has a Pilling-Bedworth ratio of 2.5, the oxide layer is at least 2.5 times the thickness of the metal consumed. The scale may be grown to an extent at which either all or just a portion of the substrate is converted into oxide scale. The thickness of the scale is preferably 1 to $10^4$ times the desired pore size of the metal sponge to be formed.

Figure 15A:
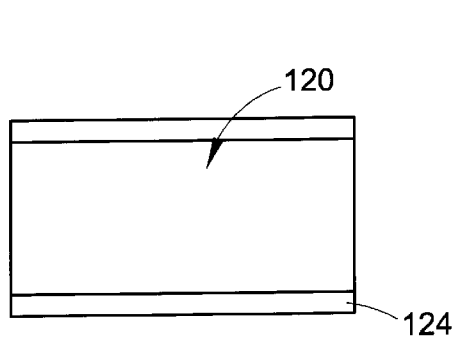
Figure 15B:
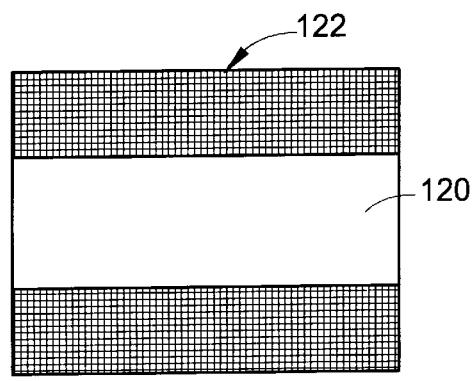
Figure 15C:
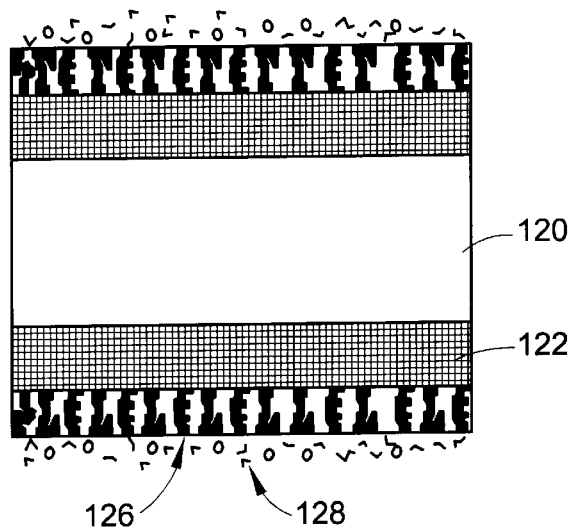
Figure 15D:
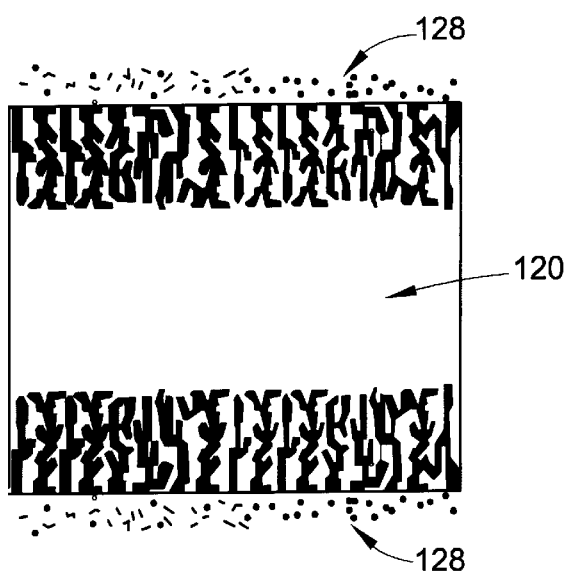

In a second step, shown in FIGS. 15C and 15D, the oxide scale is reduced at high temperature to the metal 126 with a suitable reducing agent 128. For oxides of the metals Ti, Ta, Zr, Be, or their alloys, reducing agents, such as Li, Mg, Ca, Ba, Sr, and hydrogen are effective. The reducing agent 128 is preferably in the form of a gas or liquid. For example, tantalum oxide scale may be reduced to tantalum sponge in the presence of hydrogen as follows:

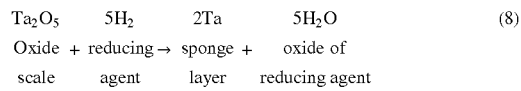

Similarly, a titanium oxide scale may be reduced to a titanium sponge with calcium as follows:

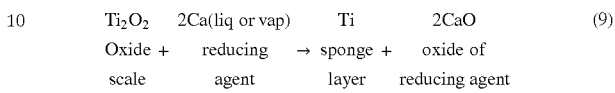

Since the reduced metal has a smaller volume than that of the oxide scale, the reduced metal is porous. Accordingly, during the reduction reaction, the oxide layer is transformed into a metal sponge with generally directional pores 130 (shown in black in FIGS. 15C and 15D) extending from the outside of the reduced metal towards the substrate reduced metal interface. The pores contain the oxide of the reducing agent, for example, water vapor in the case of hydrogen and calcium oxide in the case of calcium. The oxide may be leached out, for example, with water or an acid, such as acetic acid. In the case of water as the oxide, the water is preferably carried off as vapor. The remaining metal sponge has many of the properties of the outwardly grown sponges prepared by the first and second methods. The sponge has a high surface area with an easily accessible open porosity.

Where only part of the substrate is turned into the oxide scale and then into a metal sponge, the remaining substrate provides a path of high electrical conductivity. The substrate thus feeds or receives electrical current to or from the dendrites. A path of high electrical conductivity is important for high power capacitors which operate at high power density. However, in other instances, it is desirable to have a capacitor with a high energy storage density which can operate with a reduced power density. In this case, the entire substrate may be oxidized and reduced into the sponge.

Dielectric Film

The dielectric film 16 is readily formed by oxidizing the surface of the sponge to create a thin dielectric layer over the entire surface of the sponge. Alternatively, a second material for the dielectric may be laid down over the sponge material, such as an oxide, ceramic, or polymer. Table 1 lists oxides suitable for dielectric films. Table 2 lists characteristic values of the dielectric properties of oxides suitable for capacitor materials. A particularly favored dielectric material is titanium oxide, due to its high energy density (2250 $J/cm^3$), roughly 100 times greater than that of aluminum oxide or tantalum oxide when formed by anodizing the base metal.

TABLE 2

Properties of Dielectrics

| Dielectric | Dielectric Constant e | Dielectric Strength (MV/cm) | Charge Density ($\mu C/cm^2$) | Mass Density ($g/cm^3$) | Energy/Mass (J/g) | Energy/Volume ($J/cm^3$) |
|---|---|---|---|---|---|---|
| bulk $Al_2O_3$[**] | 7.5 to 9 | 0.07 to 0.1 | 0.05 to 0.08 | 3.97 | 0.0005–0.001 | 0.003 to 0.004 |
| thin film $Al_2O_3$ | 9 | 8.5 | 6.8 | 3.97 | 7.3 | 28.9 |
| bulk $Ta_2O_5$[**] | 9 to 15 | 0.025 to 0.07 | 0.02 to 0.09 | 8.7 | 0.0003–0.00036 | 0.00025 to |

TABLE 2-continued

Properties of Dielectrics

| Dielectric | Dielectric Constant e | Dielectric Strength (MV/cm) | Charge Density ($\mu C/cm^2$) | Mass Density ($g/cm^3$) | Energy/Mass (J/g) | Energy/Volume ($J/cm^3$) |
|---|---|---|---|---|---|---|
| thin film $Ta_2O_5$ | 25 | 7.0 | 15 | 8.7 | 6.0 | 0.0031 52.5 |
| bulk $TiO_2$[**] | 85 to 165 | .004 to 0.085 | 0.3 to 1.2 | ~4 | 0.0015–.013 | 0.006 to 0.051 |
| thin film $TiO_2$ | 15 to 900 | 7.5 | up to 600 | 4 | up to 562* | up to 2250* |
| bulk titanates | 15 to 12,000 | 0.02 to 0.12 | 0.3 to 120 | 5 | 0.0006–1.4 | 0.003 to 7.2 |

**These values were obtained from the prior art
*These values were achieved in test capacitors As seen from table 2, thin films have improved dielectric properties over the bulk material. The dielectric properties may be improved by forming mixed oxide films. For example a titanium oxide film with trace impurities of Ca, P, and C formed on a Ti foil containing the impurities was found to have a charge density of around 600 $\mu C/cm^2$ and energy/volume of 2250 $J/cm^3$, roughly six times that of an equivalent film without the impurities. By selecting the impurities and incorporating them intentionally in the oxide, i.e. a doped oxide, the dielectric properties may be modified.

There are a number of ways of forming the oxide coating for the dielectric. In a first method, the oxide film is grown by anodizing the sponge. The thickness of the oxide film is controlled by selecting the voltage applied. The thickness of a titanium oxide film is approximately 1.33 nanometers per volt. Thus, at 300 volts, a thickness of 400 nanometers is anticipated. The oxide film is formed as a layer of uniform thickness.

To form the oxide layer by this method, the sponge is immersed in a suitable electrolyte and a set DC voltage applied, depending on the desired film thickness. The electrolyte contains an oxidizing agent, such as phosphate, sulfate, or silicate.

Preferably, the sponge is subjected to a vacuum prior to infiltration of the electrolyte to remove air bubbles which could inhibit penetration of the electrolyte into the fine interdendritic cavities.

The electrolyte preferably has an electrical resistivity of less than 500 Ohm.cm. Preferred oxidizing agents include sulfuric acid ($H_2SO_4$), phosphoric acid ($H_3PO_4$), sodium phosphate ($Na_3PO_4$), and sodium silicate ($Na_2Si_2O_5 \cdot xH_2O$) at a concentration of 0.1 to about 10% in distilled water. Optionally, the electrolyte also includes an organic solvent for reducing the leakage current of the dielectric. Examples of suitable solvents-include ethanol, methanol, and acetone, alone or in combination. For example, electrolytes containing 15% ethanol, 15% methanol, 3% acetone, and 66% water, in addition to an oxidizing agent, were found to be effective. For titanium dioxide, in particular, additions of such solvents reduce leakage current by a factor of about 5.

In a second method, the oxide film is grown by thermal oxidation. In this method, an oxidizing atmosphere which includes gaseous oxygen is used. The oxygen penetrates readily into the pores of the sponge for growth of a continuous oxide film. At relatively low temperatures (less than 600° C.), oxide films of anatase are obtained on a titanium sponge. At higher temperatures, rutile films are formed. The rate of growth of the film is dependent on the temperature and on the pressure of oxygen. Oxygen pressures of greater than $10^{-6}$ atmospheres are effective for growth of a titanium oxide film on titanium. The oxygen pressure can be as high as the strength of a containing vessel will permit, typically up to about 10,000 atmospheres. Preferably the oxygen atmosphere is free of nitrogen. The presence of nitrogen results in contamination of the oxide film and high oxygen vacancy concentrations which tend to lead to leakage of current in capacitors formed from the sponge. The oxygen vacancy concentration is reduced by excluding nitrogen and also by selective doping of the film.

Where the sponge is formed by the chemical process, the reaction chamber 40 is readily used for forming the oxide film on the sponge. Following formation of the sponge, it is brought to a suitable temperature of between 0° and 800° C. and a suitable oxygen pressure is admitted to the chamber 42. After a desired film thickness is reached, the oxidation is stopped.

Alloyed oxide films may also be formed in the reaction chamber 40. For example, a $CaO/TiO_2$ mixed oxide or calcium titanate film is formed by admitting calcium vapor into the heated chamber after formation of a titanium oxide film. The calcium reacts with the titanium oxide to form CaO and Ti. Upon renewed admission of oxygen, an alloyed oxide film of CaO and $TiO_2$ is formed. A temperature of about 600 to 900° C. is sufficient to maintain a vapor pressure of calcium for forming the film. Other titanate formers, such as Mg, Sr, Be, and Ba may be similarly used to form alloyed oxide films or titanates. The vapors of the titanate formers aid in drawing out oxygen which has dissolved in the titanium lattice. The titanate former is optionally added step-wise, with additional introductions of oxygen between each addition.

Alternatively, for oxide films produced by immersion of the sponge in an electrolyte, a salt of the alloying oxide, such as a Mg, Ca, Sr, Be, or Ba salt, is optionally added to the electrolyte in order to form titanium oxide alloyed with these elements. Dielectric constants for alloyed films are higher than for pure titanium oxide films, and may be up to around 12,000.

The properties of the dielectric can be modified further by doping the oxide film with other materials. In the case of titanium oxide, for example, the dielectric properties have been found to vary considerably with the inclusion of small amounts of dopants. For example, good dopants for titanium oxide include higher valent cations, primarily pentavalent and hexavalent cations, such as $Cr^{6+}$, $V^{5+}$, $Ta^{5+}$, $Mo^{6+}$, $Nb^{5+}$, $W^{6+}$, and $P^{5+}$, as well as the titanate formers Sr, Mg, Ca, Ba, and Be, as discussed above. Only a small amount of the dopant is needed to provide improved dielectric properties, for example, amounts of up to about one percent of these dopants can provide a ten-fold improvement in the dielectric constant.

The dopant is thought to reduce oxygen vacancy concentration, resulting in reduced current leakage from the capacitor. For example, with titanium oxide, lattice defects tend to occur in the form of oxygen ion vacancies. These, along with grain boundaries are the most likely facilitators of leakage current. Doping with pentavalent or hexavalent cations decreases the oxygen vacancy concentration.

The dopant may be added either before, during, or after formation of the oxide film. For example, when using the anodizing process to form the oxide film, doping may be done by providing a higher valent cation in the electrolyte so that the cation is incorporated into the growing titanium oxide film where it reduces the oxygen vacancy concentration. Salts of Ca, Ba, and the like, may also be added to the electrolyte. For example, $CaHPO_4$ may be added to an 0.2% $H_2SO_4$–1% $H_3PO_4$ electrolyte. By saturating the electrolyte with the $CaHPO_4$, calcium concentrations as high as about 0.3 atom % may be achieved in a titanium oxide film. Such concentrations are effective for reducing the leakage current from the oxide film and increasing the dielectric constant as compared with a pure oxide. For example, a titanium oxide film doped with 0.3 atom % calcium had a leakage current of 40 micro-amperes/$cm^2$ and a dielectric constant of 900, as compared with a leakage current of 200 micro-amperes/$cm^2$ and a dielectric constant of around 165 for the pure oxide.

Alternatively, the titanium surface layer may be alloyed or doped before oxidation. For example, a titanium-dopant alloy may be provided as the substrate, such as titanium-beryllium. The growing oxide film then incorporates the alloy or dopant elements, in this case, beryllium oxide.

Exposure of oxidized titanium to vapors of elements, such as Mg, Ca, Sr, and Ba, provides an alternative method of introducing these elements as dopants or alloy elements into the oxide. Table 3 lists the vapor pressures in atmospheres of several elements suitable for oxide alloying.

TABLE 3

Vapor Pressures of Earth Alkali Metals as a Function of Temperature

| | 500° C. | 600° C. | 700° C. | 800° C. | 900° C. | 1000° C. |
|---|---|---|---|---|---|---|
| Magnesium | $1 \times 10^{-4}$ | $2 \times 10^{-3}$ | $9 \times 10^{-3}$ | $5 \times 10hu -2$ | $2 \times 10^{-1}$ | $5 \times 10^{-1}$ |
| Calcium | $6 \times 10^{-7}$ | $1 \times 10^{-5}$ | $1.5 \times 10^{-4}$ | $1 \times 0^{-3}$ | $5 \times 10^{-3}$ | $1.5 \times 10^{-2}$ |
| Strontium | $5 \times 10^{-6}$ | $8 \times 10^{-5}$ | $7 \times 10^{-4}$ | $4 \times 0^{-3}$ | $1 \times 10^{-2}$ | $5 \times 10^{-2}$ |
| Barium | $3 \times 10^{-7}$ | $4.5 \times 10^{-4}$ | $2 \times 10^{-5}$ | $1 \times 10^{-4}$ | $8 \times 10^{-4}$ | $3 \times 10^{-3}$ |

Where the sponge is of a metal that does not readily form a good dielectric oxide film, the sponge may be coated with a suitable dielectric. For example, sponges grown from copper may be coated with plastic or ceramic, as the dielectric film.

Capacitor Electrolytes

The electrolyte serves two functions. One is to collect and conduct electrical charge, i.e., it serves as the cathode for the capacitor. The second function of the electrolyte is to enable spontaneous repair of the dielectric film in the event of local breakdown of the oxide film. To serve as a repair agent, the electrolyte is maintained in intimate contact with the dielectric film throughout the capacitor volume. This contact is preferably achieved by vacuum-infiltration of the electrolyte, and may be further improved by exerting external pressure on the electrolyte bath.

A number of materials form suitable capacitor electrolytes. The electrolyte may be liquid or solid. Liquid electrolytes include low-melting alkali metals saturated with dissolved oxygen and aqueous solutions of oxidizing agents, such as $H_2SO_4$, $H_3PO_4$, $Na_3PO_4$, and $Na_2Si_2O_5.xH_2O$. Solid electrolytes include $MnO_2$, which is particularly preferred for tantalum capacitors and is also suitable for titanium capacitors.

For titanium capacitors, low-melting alkali metals saturated with dissolved oxygen are particularly effective electrolytes. They provide high electrical conductivity and thus enable capacitors to have especially high power densities. Examples of such alkali metals include sodium, potassium, rubidium, and cesium. Eutectic alloys of these metals remain liquid to below room temperature. Eutectic alloys or near eutectic alloys between potassium and cesium are particularly preferred. For example, an alloy formed from a eutectic composition of 50 atom percent potassium (22.7 weight percent) and the balance cesium remains liquid to a temperature of –37.5° C. Alloys that vary in composition by plus or minus 20 atom percent, or less, from the eutectic composition are suitable liquid electrolytes from below 0° C. to up to about 300° C.

In addition to high electrical conductivity, the liquid metal electrolyte has the advantage of absence of solidification shrinkage voids which may occur in solid electrolytes such as $MnO_2$. The operating temperatures of eutectic K-Cs filled titanium capacitors, for example, range from –37.5° C. to over 200° C.

The liquid metal electrolyte is preferably saturated with oxygen by the incorporation of oxygen-rich compounds of thermodynamic stability lower than that of the oxide of the dielectric film. For example, liquid potassium saturated with potassium oxide precipitates contains 0.10 mass percent oxygen in solution at 100° C. and 0.27 mass percent oxygen at 200° C. (Smithells Metals Reference Book, 7th edition, edited by E. A. Brandes and G. B. Brook, Butterworth-Heinemann publisher, (1992) Table 12–19). For repair of titanium oxide dielectrics, oxide, phosphate, or silicate precipitates, such as those of Na, Cs, or K, may be included in the liquid metal electrolyte for additional oxygen reserves. These oxygen-rich compounds aid repair of the dielectric film by oxidizing the underlying titanium sponge in regions where localized breakdown of the oxide layer has occurred. During a repair reaction, such precipitates are converted into the metal, such as metallic sodium or potassium. Because these oxide precipitates have Pilling-Bedworth ratios of less than one, their reduction results in a volume increase which enhances tight contact between the electrolyte and the dielectric film.

Capacitors produced using the sponges described have a variety of applications, including devices for the surface mount industry, power supplies, switching regulators, motor control-regulators, computer electronics, audio amplifiers, surge protectors, metal forming machines, and resistance spot welders. Because of their relative compactness compared to conventional capacitors, they can be used in situations were conventional capacitors would be too bulky, such as in electrically powered automobiles, trucks and locomotives for electric power management of battery-driven motors, recuperation of breaking energy, and for propulsion of projectiles or space vehicles where weight constraints are important. Capacitors produced with titanium sponges are operable at frequencies of 20 Hz to 20,000 Hz. Lower frequencies are anticipated by careful selection of dopants to reduce the leakage of current. The size of the capacitor is variable, from less than one $mm^3$ to more than one m depending on the energy requirement.

Titanium capacitors are capable of delivering up to 1000 times the power of conventional electrochemical supercapacitors. The capacitors may have energy densities of $10^{-2}$ to 50 Wh/kg, or more, and power densities of 100,000 to 10,000,000 W/kg, or more, of the total package. For example, a simply packaged capacitor formed in the laboratory from a titanium sheet with an oxide thickness of 400 nm had a capacitance of 2 microfarads, an internal resistance of 150 ohms, a maximum voltage of 300 volts, an energy density of 0.9 J/g (0.25 Wh/kg), and a short circuit power density of 6 kW/g, yet weighed only 100 mg and had a dielectric surface area of 1 $cm^2$. The capacitor had a dielectric energy density of over 150 Wh/kg and a packaging efficiency of 0.16%. A sponge capacitor with packaging efficiency of 30% would be expected to yield an energy density of 50 Wh/kg, or above. Production of capacitor grade titanium sponge is expected to provide even higher energy and power densities.

The invention has been described with reference to the preferred embodiment. Obviously, modifications and alterations will occur to others upon reading and understanding the preceding detailed descriptions. It is intended that the invention be construed as including all such modifications and alterations insofar as they come within the scope of the appended claims or the equivalents thereof.

Having thus described the preferred embodiment, the invention is now claimed to be:

1. A capacitor comprising:
   an anode which includes a directionally grown sponge having a high surface area, the sponge defining dendrites having a width of less than about 30 micrometers;
   a dielectric film on a surface of the sponge; and,
   a cathode which includes an electrolyte in contact with the dielectric film.

2. The capacitor of claim 1, wherein the sponge includes an element selected from the group consisting of titanium, aluminum, tantalum, niobium, zirconium, vanadium, chromium, silicon, germanium, copper, silver, and alloys thereof.

3. The capacitor of claim 2, wherein the sponge is titanium.

4. The capacitor of claim 1 wherein the sponge defines dendrites.

5. The capacitor of claim 4, wherein the dendrites have a width of from about 200 nanometers to 30 micrometers.

6. The capacitor of claim 5, wherein the dendrites have a width of 1 micrometer, or less.

7. The capacitor of claim 4, wherein the anode includes at least one substrate layer and wherein the dendrites extend from the substrate.

8. The capacitor of claim 7, wherein the dendrites extend perpendicularly from the substrate layer.

9. The capacitor of claim 7, wherein the dendrites extend from one surface of the substrate layer.

10. A capacitor, comprising:
    an anode which includes a directionally grown sponge having a high surface area, the anode including a plurality of substrate layers, the dendrites extending from the substrate;
    a dielectric film on a surface of the sponge; and
    a cathode which includes an electrolyte in contact with the dielectric film.

11. The capacitor of claim 10, wherein the layers are arranged in parallel.

12. The capacitor of claim 7, wherein the substrate is in the form of a foil, wire, ribbon, cast structure, or sheet.

13. A capacitor comprising:
    an anode which includes a directionally grown sponge having a high surface area, the anode including at least one substrate layer, the substrate layer being formed from a material which is the same as that of the sponge, the dendrites extending from the substrate layer;
    a dielectric film on a surface of the sponge; and
    a cathode which includes an electrolyte in contact with the dielectric film.

14. The capacitor of claim 13, wherein the substrate is formed from titanium.

15. The capacitor of claim 7, wherein the substrate is formed from a material which includes a metal selected from the group consisting of silver, copper, aluminum, and other metals of high electrical conductivity.

16. The capacitor of claim 1, wherein the dielectric film includes an oxide formed by oxidizing the surface of the sponge.

17. The capacitor of claim 1, wherein the dielectric film includes a dielectric coating, selected from the group consisting of ceramics, glass, plastics, other electrically insulating materials, and combinations thereof.

18. The capacitor of claim 17, wherein the sponge includes a metal selected from the group consisting of copper, silver, gold, aluminum, and other metals of high electrical conductivity.

19. The capacitor of claim 1, wherein the dielectric film includes a material which reduces current leakage.

20. A capacitor comprising:
    an anode which includes a directionally grown sponge having a high surface area;
    a dielectric film on a surface of the sponge, the dielectric film including a dopant selected from the group consisting of oxides of Ba, Ca, Mg, Sr, Be, and combinations thereof; and
    a cathode which includes an electrolyte in contact with the dielectric film.

21. A capacitor comprising:
    an anode which includes a directionally grown sponge having a high surface area;
    a dielectric film on a surface of the sponge, the dielectric film including:
      an oxide formed by oxidizing the surface of the sponge, and
      a low concentration of one or more cations having a higher valency than that of the oxide; and
    a cathode which includes an electrolyte in contact with the dielectric film.

22. The capacitor of claim 21, wherein the higher valent cation is at a concentration of less than about 1%.

23. The capacitor of claim 21, wherein the dielectric film includes a higher valent cation selected from the group consisting of $Cr^{6+}$, $V^{5+}$, $Ta^{5+}$, $Mo^{6+}$, $Nb^{5+}$, $W6+$, $P^{5+}$ and combinations thereof.

24. A capacitor, comprising:
    an anode which includes a directionally grown sponge having a high surface area;
    a dielectric film on a surface of the sponge; and
    a cathode which includes an electrolyte in contact with the dielectric film, the electrolyte including a low-melting metal saturated with a source of oxygen selected from the group consisting of dissolved oxygen, oxygen rich compounds, and combinations thereof.

25. The capacitor of claim 24, wherein the low-melting metal remains liquid in the range of from below zero to 300 degrees Celsius.

26. The capacitor of claim 24, wherein the low-melting metal is selected from the group consisting of sodium, potassium, rubidium, cesium, and combinations thereof.

27. The capacitor of claim 24, wherein the low-melting metal is a eutectic alloy or near eutectic alloy.

28. The capacitor of claim 27, wherein the low-melting metal is a eutectic alloy or near eutectic alloy of potassium and cesium.

29. The capacitor of claim 24 wherein the oxygen in the electrolyte is augmented by an oxygen-rich compound of a thermodynamic stability lower than a thermodynamic stability of the dielectric film.

30. The capacitor of claim 29, wherein the dielectric film includes titanium oxide and the oxygen-rich compound is selected from the group consisting of oxides, sulfates, phosphates, and silicates of sodium, cesium, and potassium, and combinations thereof.

31. The capacitor of claim 1, wherein the sponge includes titanium and the dielectric includes titanium oxide, and wherein the capacitor has an energy density of from about $10^{-2}$ to 50 Watt hours per kilogram of titanium and a power density of from 100,000 to 10,000,000 Watts per kilogram of titanium.

32. A directionally grown sponge suitable for forming capacitor anodes, the sponge being formed by a method which includes thermally growing dendrites on a substrate, the dendrites consisting essentially of an element selected from the group consisting of aluminum, antimony, arsenic, beryllium, bismuth, cadmium, chromium, cobalt, copper, gallium, germanium, hafnium, iron, lead, magnesium, manganese, nickel, niobium, selenium, silicon, silver, tantalum, tellurium, thallium, tin, titanium, vanadium, zinc, zirconium, and alloys thereof.

33. The sponge of claim 32, wherein the dendrites include titanium.

34. The sponge of claim 32, wherein the dendrites have a width of from about 200 nanometers to 30 micrometers.

35. The sponge of claim 34, wherein the dendrites have a width of 1 micrometer, or less.

36. The sponge of claim 32, wherein the dendrites extend perpendicularly from the substrate.

37. The sponge of claim 32, wherein the dendrites extend from at least one surface of the substrate.

38. The sponge of claim 32, wherein the substrate is in the form of a foil, wire, ribbon, cast structure, or sheet.

39. The sponge of claim 32, wherein the substrate is formed from a material which is the same as that of the sponge.

40. The sponge of claim 32, wherein the substrate is formed from a material which includes a metal selected from the group consisting of silver, copper, and aluminum.

41. An anode adapted for use in a capacitor comprising a substrate having a plurality of metallic dendrites thereon, whereby said anode is characterized by its high surface area, the surface area being at least 10 $cm^2/gm$.

* * * * *